United States Patent [19]

Wagai et al.

[11] Patent Number: 5,187,471
[45] Date of Patent: Feb. 16, 1993

[54] RADIO TELECOMMUNICATION APPARATUS

[75] Inventors: Kiyoshi Wagai, Hino; Tatsuaki Sekigawa, Hachiioji; Shihoko Ohyanagi, Kokubunji; Mitsuji Shiono, Oome, all of Japan

[73] Assignee: Kabushiki Kaisha Toshiba, Kawasaki, Japan

[21] Appl. No.: 698,327

[22] Filed: May 6, 1991

Related U.S. Application Data

[63] Continuation of Ser. No. 370,708, Jun. 23, 1989, abandoned.

[30] Foreign Application Priority Data

Jun. 24, 1988 [JP] Japan .................................. 63-156471

[51] Int. Cl.[5] .............................................. H04Q 7/00
[52] U.S. Cl. ............................ 340/825.44; 340/825.72; 455/343
[58] Field of Search ........................ 340/825.44, 825.47, 340/825.48, 825.69, 825.72, 311.1; 455/343; 379/57, 63

[56] References Cited

U.S. PATENT DOCUMENTS

| | | | |
|---|---|---|---|
| 4,384,361 | 5/1983 | Masaki | 455/343 |
| 4,618,860 | 10/1986 | Mori | 340/825.44 |
| 4,642,632 | 2/1987 | Ohyagi et al. | 340/825.44 |
| 4,668,949 | 5/1987 | Akahori et al. | 340/825.47 |
| 4,802,240 | 1/1989 | Yamaguchi et al. | 340/825.44 |
| 4,811,362 | 3/1989 | Yester, Jr. et al. | 455/343 |
| 4,839,639 | 6/1989 | Sato et al. | 340/825.44 |
| 4,860,003 | 8/1989 | DeLuca et al. | 340/825.44 |

Primary Examiner—Donald J. Yusko
Assistant Examiner—Peter Weissman
Attorney, Agent, or Firm—Oblon, Spivak, McClelland, Maier & Neustadt

[57] ABSTRACT

A method and apparatus of this invention changes a frequency at which a control circuit (signal processing circuit) operates in accordance with an operational load of a circuit. More specifically, a pager comprises a signal processing circuit for detecting a first signal sequence within received signals by comparing the received signals with codes originated in the pager and for identifying a second signal sequence received in association with the first signal sequence within the received signals, the signal processing circuit being supplied with a first clock signal having a first frequency when the signal processing circuit detects the first signal sequence and being supplied with a second clock signal having a second frequency when the signal processing circuit identifies the second signal sequence. Still, the frequency applied to the signal processing circuit may be changed in accordance with the operational load of the circuit.

27 Claims, 9 Drawing Sheets

RADIO TELECOMMUNICATION APPARATUS

This application is a continuation of application Ser. No. 07/370,708, filed on Jun. 23, 1989, now abandoned.

BACKGROUND OF THE INVENTION

1. Field of the Invention

The present invention relates to a signal processing unit for use in electronic equipment and, specifically, relates to a signal processing unit for use in a radio telecommunication apparatus such as a pager, a cordless telephone, or a mobile telephone.

2. Description of the Prior Art

Figure 9:
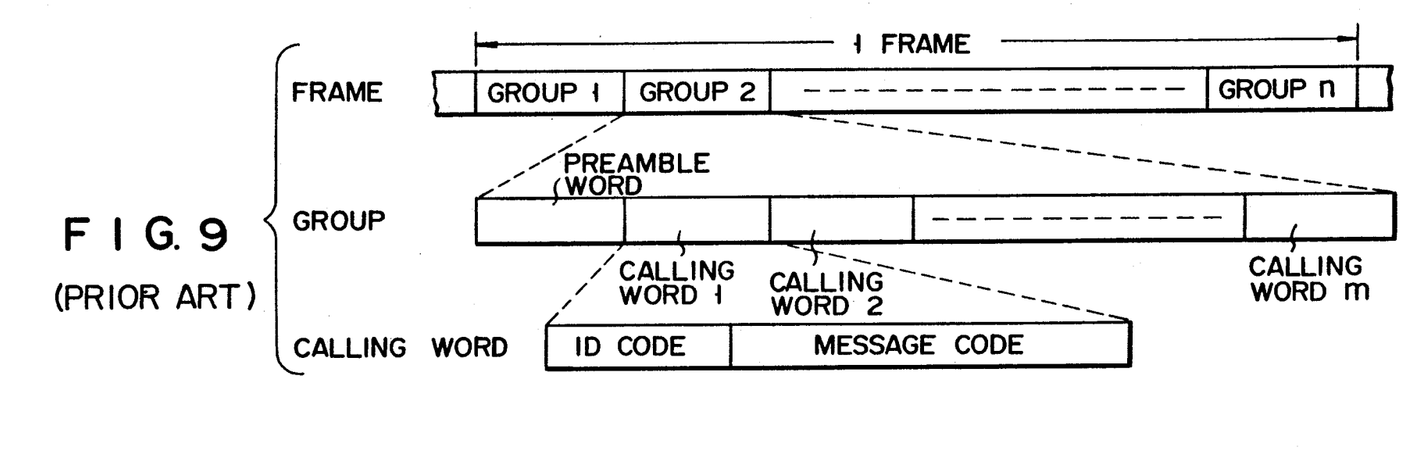
FIG. 9 schematically illustrates the paging signal used in prior-art paging system.

In recent years, a new type of a paging system has been developed in which a base station transmits message information, and any called one of the pager receivers subscribed to this system displays the message information. The paging signal used in this system is schematically shown in FIG. 9. As is illustrated in this figure, each frame of the paging signal is time-divided into n groups. Further, each group is time-divided into one synchronization or preamble word and m calling words. Each calling word is formed of an identification (ID) code and a message code.

To call a selected pager receiver, a caller dials a telephone numbers assigned to the pager receiver, thus reaching the base station. Then, the caller sends message information to the base station. The base station generates the ID code assigned to the selected pager receiver and the message code corresponding to the message information, and inserts these codes into one of vacant calling words of that group of the paging signal to which the selected pager receiver belongs. Then, the base station transmits the paging signal.

Figure 10:
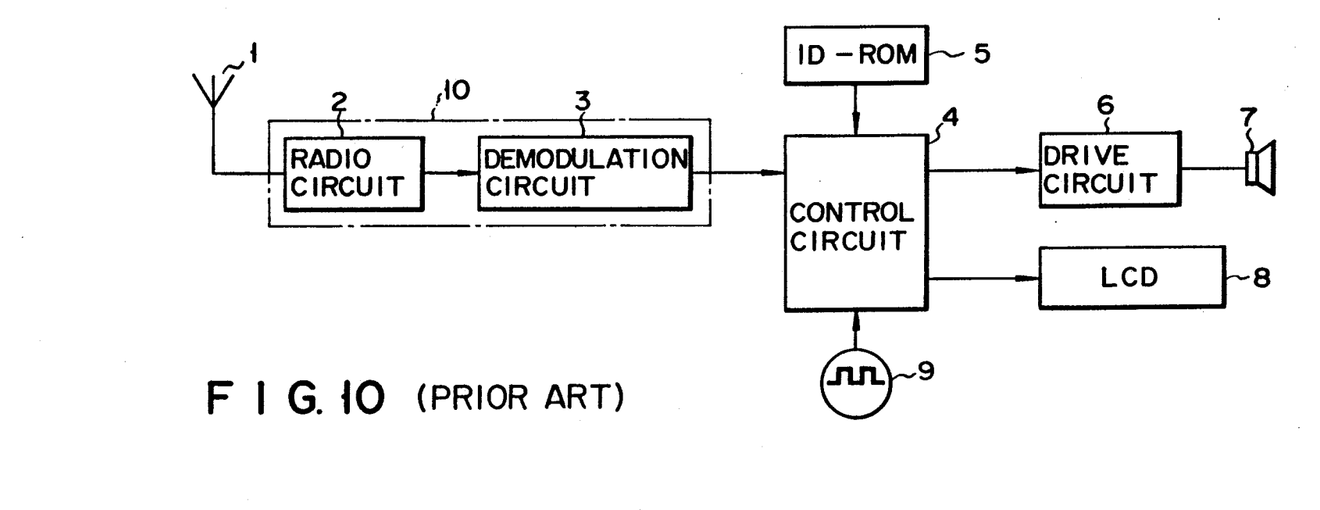
FIG. 10 is a block diagram illustrating the prior-art pager receiver.

As is illustrated in FIG. 10, each pager receiver comprises an antenna 1, a receiver circuit 10, a control circuit 4, and ID ROM 5, a drive circuit 6, a loudspeaker 7, an LCD (Liquid-Crystal Display) 8, and a clock generator 9,. The receiver circuit 10 has a radio circuit 2 and a demodulation circuit 3. In operation, the antenna 1 catches the paging signal which the base station has transmitted. The signal is supplied to the receiver circuit 10. In the circuit 10, the radio circuit 2 receives the paging signal, and the demodulation circuit 3 demodulates the paging signal. The demodulated signal is output from the receiver circuit 10 to the control circuit 4.

The control circuit 4 has, for example, a microcomputer (CPU). The CPU is driven by a clock signal having a frequency of, for example, 480 KHz, generated from the clock generator 9. The control circuit 4 collates the ID code inserted in the demodulated paging signal, with the ID code stored in the ID ROM 5 and assigned to the pager receiver. If the ID codes are identical, the control circuit 4 determines that the pager receiver has been called. Then, the control circuit 4 supplies a drive signal to the drive circuit 6. The circuit 6 drives the loudspeaker 7, and the loudspeaker 7 generates a beep sound, telling the user of the pager receiver that his receiver is being called. When the ID codes are found to be identical, the message code is supplied from the receiver circuit 10 to the control circuit 4. The circuit 10 corrects error bits, if any, of the message code, and then demodulates the message code into the original message information. The control circuit 4 outputs this message information to the LCD 8, which displays the message information.

Generally, a method known as "battery saving technique" is adopted in each pager receiver to save power so as to lengthen the lifetime of the battery loaded in the pager receiver. More precisely, the control circuit 4 controls the power-source unit including the battery such that power is supplied from the battery to the receiver circuit 10 only while the antenna 1 is receiving group signals which is transmitted for a group of pagers including the pager. No power is supplied to the circuit 10 while any other groups are transmitted. Since n groups form the frame, the power consumed in the circuit 10 is about 1/n of the power which is required if power is supplied to the circuit 10 all the time. Even under the battery saving technique, control circuit 4 is continuously powered and driven by a clock signal.

In a prior art pager, a frequency of the clock signal is set to be so high that error correction operations are properly performed against the received message signal accompanied by an error connection code. The high frequency art which the control circuit 4 is continuously driven causes considerable power consumption. This is because the power is consumed greater in a microprocessor device constituting the control circuit 4 as the frequency at which the microprocessor device is driven increases.

SUMMARY OF THE INVENTION

Accordingly, it is an object of the present invention to provide an improved radio telecommunication apparatus wherein the power consumed in a control circuit may be greatly conserved.

It is a further object of the present invention to provide an improved radio telecommunication apparatus wherein message signals to the pager may be accurately identified by the pager while conserving battery consumption thereof.

It is still a further object of the present invention to provide an improved pager wherein the frequency, on the basis of which a control circuit of the pager operates, may be properly changed in accordance with received signals.

It is still a further object of the present invention to provide a pager receiver which consumes a little power while receiving groups in a paging signal other than the group to which it belongs, thereby lengthening the lifetime of the battery incorporated in the pager.

It is still a further object of this invention to provide a pager receiver which consumes a little power while receiving groups in a paging signal other than the group to which it belongs, and also while receiving any group to which it belongs and which contains the ID code assigned to it, thereby lengthening the lifetime of the battery incorporated in it.

It is still a further object of the present invention to provide a signal processing unit wherein the power consumed therein may be conserved.

To achieve one or more of the objects of the present invention, there is provided at least a signal generator capable of generating a plurality of clock signals, each of which has a different frequency. In the event that a control circuit of electronic equipment such as a radio telecommunication apparatus is required to operate at a high speed, a high frequency clock signal is applied to the control circuit from the signal generator so that the control circuit operates on the basis of the high frequency clock signal. On the other hand, in the event that the control circuit is not required to operate at such a high speed, a comparative low frequency clock signal is applied to the control circuit so that the control circuit operates on the basis of the comparative low frequency signal.

More specifically, in case of a pager, the pager is not allowed to inspect the content of the message signal because the content is arbitrarily selected by a calling person. As mentioned above, the message signals transmitted from a base station are accompanied by an error correction code. The content of the message signal may not be identified until error bits in the message signal, if any, are corrected by calculating in accordance with a conventional error code correcting technique. To perform the calculation for detecting and correcting error bits, the control circuit is required to operate at a high speed. Accordingly, when the control circuit detects a first signal sequence such as the message signals, the control circuit is driven by a signal generator for generating a high frequency clock signal so as to operate on the basis of the high frequency clock signal. On the other hand, a content of preamble signal including a synchronization signal and a group designation signal may be expected since the synchronization signal is a predetermined signal sequence and a group designation code for identifying the group, to which the pager belongs, is stored in the pager. Also, an identification code for identifying the pager is stored in the pager. Even if an identification signal transmitted from a base station is accompanied by an error correcting code, the error correcting code may be easily generated at the pager on the basis of the stored identification code. These signals may be easily detected by comparing with the codes stored in the pager and the codes generated from the stored codes in a bit by bit basis. To perform the comparison for detecting these signals, the control circuit is not required to operate at such a high speed. Accordingly, when the control circuit detects a second signal sequence such as a synchronization signal, a group signal, or an identification signal, the control circuit may be driven by a signal generator for generating a comparative low frequency clock signal so as to operate on the basis of the low frequency clock signal. Still, in the event that the battery saving technique as mentioned above is adopted to the pager, the control circuit may be driven by a clock signal having a lower frequency during a recess period wherein a radio circuit is not powered. This is because the control circuit only measures a lapse of time for the recess period. Therefore, a considerable amount of power may be conserved in a pager by selectively supplying the control circuit with a clock signal among a plurality of clock signals.

It should be noted that any other kind of signal or modified signal sequence can be a first signal sequence or a second signal sequence according to the operational load of the control circuit caused by the signal or the signal sequence while a synchronization signal, a group designation signal, an identification signal, or a message signal is exemplary referred to as a first signal sequence or a second signal sequence in the above description.

In other words, to achieve one or more objects of the present invention, there is provided a pager receiver comprising a control circuit, first clock generation means, and second clock generation means. The control means is a two-clock type microcomputer. This is because the control circuit of any pager receiver must operate at a high speed while the pager receiver is receiving group signals to a group of pagers including the pager (the pager's group signals), whereas it need not operate at a high speed while the receiver is receiving any other group signals to other groups of pagers (the other group signals). The first clock generation means generates and supplies a first clock signal having a predetermined frequency to the microcomputer, while the pager receiver is receiving the pager's group signals. The second clock generating means generates and supplies a second clock signal having a lower frequency than that of the first clock signal to the microcomputer, while the pager receiver is receiving the other group signals. The first clock signal is used as a reference clock signal of the control circuit.

While the pager receiver is receiving the pager's group signals, the first clock generating means generates and supplies a first clock signal having a predetermined frequency to the control circuit, and the control circuit thus operates at a high speed. On the other hand, while the pager receiver is receiving the other group signals, the second clock generating means generates and supplies a second clock signal having a lower frequency than that of the first clock signal to the control circuit, and the control circuit therefore operates at a low speed. As is generally known, the higher the frequency at which a generator generates clock pulses, the more power the clock generator consumes. Hence, the pager receiver consumes less power while receiving the other group signals than the conventional pager receiver wherein a clock generator keeps generating a first clock signal all time the pager receiver receives the whole paging signal. Obviously, the battery lasts longer in the pager receiver of this invention than in the conventional pager receiver.

Furthermore, to attain one or more objects of the present invention, there is provided a pager receiver comprising a control circuit, first clock generating means, and second clock generating means. The control means is a two-clock type microcomputer. The first clock generating means generates and supplies a first clock signal having a predetermined frequency to the microcomputer, only while the pager receiver is receiving the message codes to the pager. The second clock generating means generates and supplies a second clock signal having a lower frequency than ,that of the first clock signal to the microcomputer at all other times. This is because the control circuit of any pager receiver need not operate at a high speed all the time the pager receiver receives group signals to a group of pagers including the pager. The control circuit needs to be driven at a high speed only while correcting error bits, if any, in a message code contained in that group to which the pager receiver belongs, and it suffices to supply the second clock signal to the control circuit at all other times.

Therefore, the first clock generating means operates, generating a first clock signal, only while the pager receiver is receiving the message codes to the pager. Thus the pager receiver consumes little power not only while it is receiving the other group signals, but also while it is receiving any signals other than the message code within the pager's group signals. As a result, the battery lasts longer in this pager receiver of this invention than in the above pager receiver according to the invention, and even longer than in the prior-art pager receiver.

DETAILED DESCRIPTION OF THE PREFERRED EMBODIMENTS

First Embodiment

Figure 1:
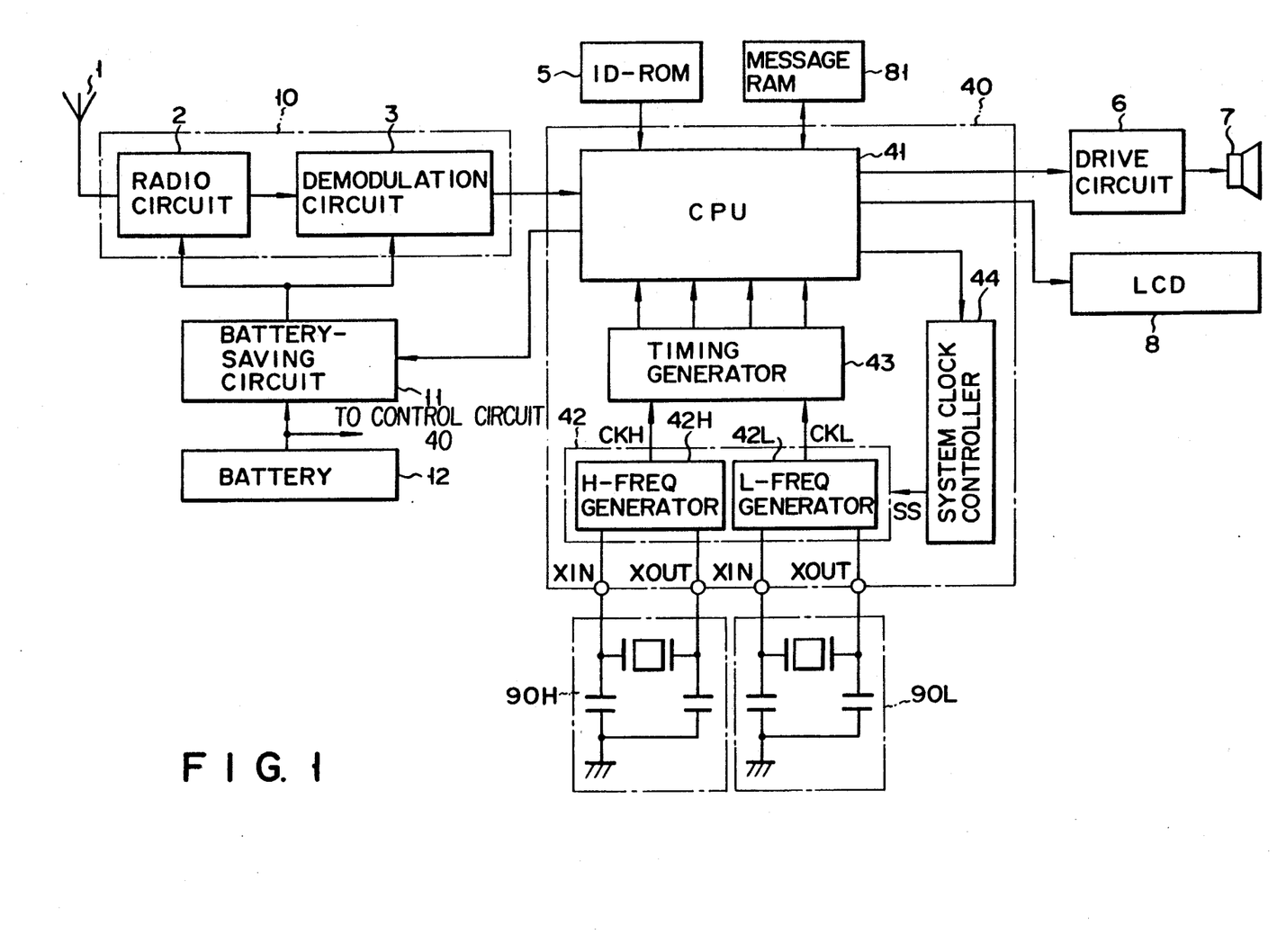
FIG. 1 is a block diagram illustrating a pager receiver which is a first embodiment of the present invention.

FIG. 1 schematically illustrates a pager receiver according to a first embodiment of the present invention.

Referring to FIG. 1, an antenna 1 catches paging signals which have been transmitted from a base station (not shown). The antenna 1 supplies the signals to a receiver circuit 10 which comprises a radio circuit 2 and a demodulation circuit 3. The radio circuit 2 receives the paging signal and supplies it to the demodulation circuit 3. The demodulation circuit 3 demodulates the paging signals and outputs the demodulated signal to a control circuit 40. The control circuit 40 collates the ID code contained in the paging signals, with the ID code assigned to the pager receiver and stored in an ID ROM 5 connected to the control circuit 40. If the ID codes are identical, the circuit 40 determines that the pager has been paged, and generates an alarm signal to a drive circuit 6. In response to the alarm signal, the circuit 6 drives a loudspeaker 7. The loudspeaker 7 generates an alarm tone, informing a user of the pager receiver that he is being called. When the ID codes are found to be identical, the control circuit 40 receives the message code contained in the paging signal, corrects error bits, if any, in the message code, and demodulates the message code into message information. This information is supplied from the control circuit 40 to an LCD (Liquid-Crystal Display) 8. The message code is supplied from the control circuit 40 to a message RAM 81 and stored therein.

The control circuit 40 is a single-chip IC comprising a two-clock microcomputer (CPU) 41, a clock generator 42, a timing generator 43, and a system-clock controller 44. The CPU 41, which is the main component of the control circuit 40, has an arithmetic logic unit (ALU), an accumulator, an instruction recorder, a program counter, various registers, I/0 ports, a program ROM, and a data RAM. The clock generator 42 has a high-frequency clock generator 42H and a low-frequency clock generator 42L. The high-frequency clock generator 42H is connected by connecting terminals XIN and XOUT to a ceramic oscillator 90H, whereas the low-frequency clock generator 42L is connected by connecting terminals XIN and XOUT to a ceramic oscillator 90L. These clock generators 42H and 42L energize the ceramic oscillators 90H and 90L, respectively, thereby generating a high-frequency (1.2 MHz) clock signal CKH and a low-frequency (32 KHz) clock signal CKL. The clock generator 42 supplies these clock signals CKH and CKL to the timing generator 43. The timing generator 43 frequency-divides the high-frequency clock signal CKH and the low-frequency clock signal CKL, thus generating the system clock signals which the CPU 41 requires. The CPU 41 supplies a clock-setting command to the system controller, when necessary. In response to this command, the system-clock controller 44 supplies a control signal SS to the clock generator 42. The high-frequency clock generator 42H and the low-frequency clock generator 42L have an oscillation start/stop control terminal each, and they are alternately driven in accordance with the level of the control signal SS.

The pager receiver further comprises a battery-saving circuit 11. This circuit 11 operates as follows, in response to the battery-saving control signal supplied from the control circuit 40. The circuit 11 supplies power from a battery 12 to the receiver circuit 10 while the pager receiver is receiving that group contained in the paging signal to which the pager receiver belongs, thereby driving the receiver circuit 10, and supplies no power to the circuit 10 while the pager receiver is receiving that any other group contained in the paging signal, thus setting the circuit 10 in an inoperative condition.

Figure 2:
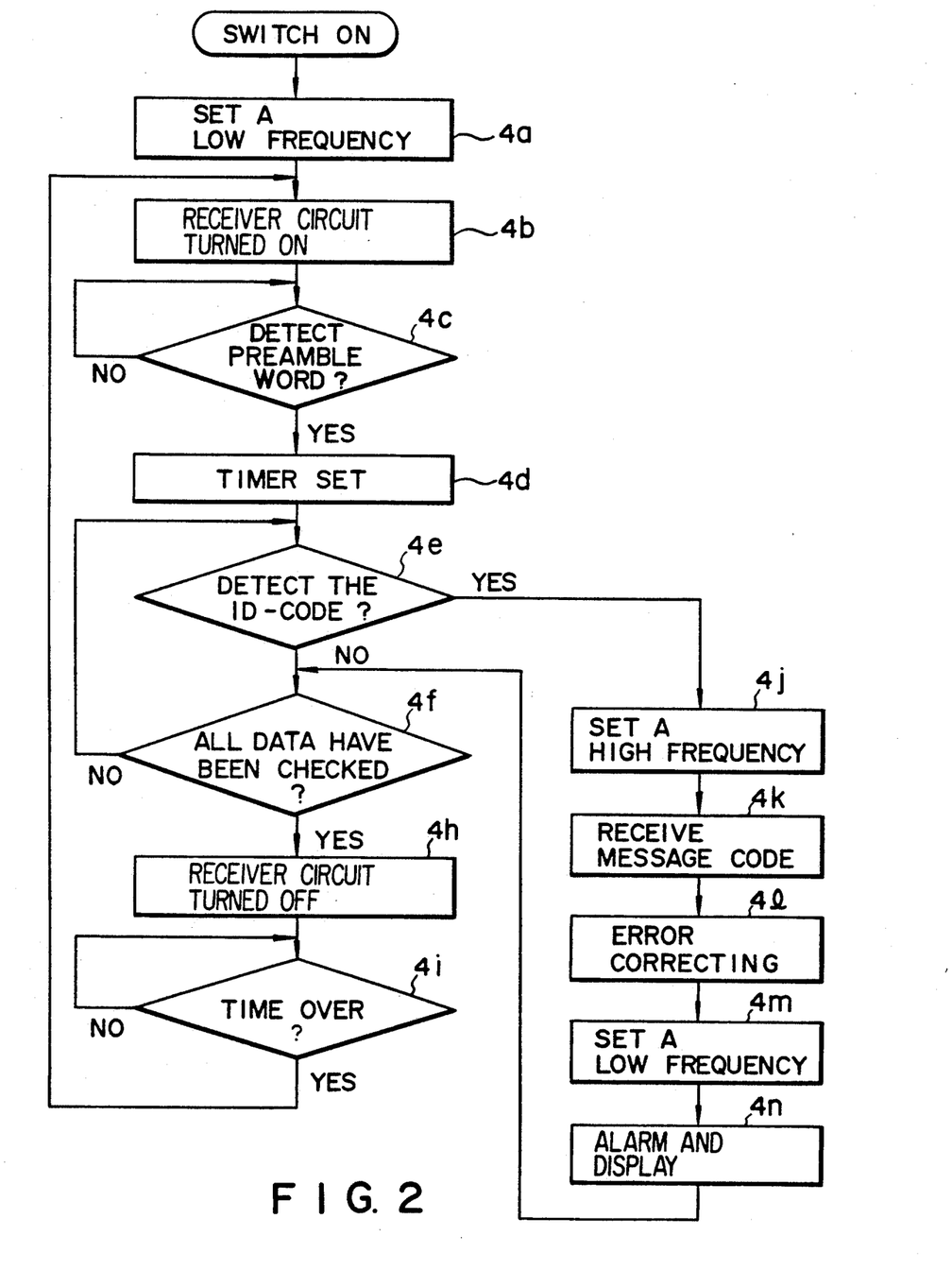
FIG. 2 is a flow chart explaining the operation of the control circuit incorporated in the pager receiver shown in FIG. 1.

The operation of the pager receiver described above will now be explained, with reference to the flow chart of FIG. 2 which explains operations of the CPU 41 in the control circuit 40.

First, the user turns on the power switch (not shown) of the pager receiver, whereby power is supplied from the power-source unit (not shown, either) to the control circuit 40. The CPU 41 of the circuit 40 initializes itself, and outputs a low-frequency setting signal to the system-clock controller 44 in step 4a. In response to this signal, the system-clock controller 44 supplies a control signal SS to the clock generator 42, for driving the low-frequency clock generator 42L. As a result, the low-frequency clock generator 42L starts outputting a low-frequency clock signal CKL, whereas the high-frequency clock generator 42H remains in an inoperative condition. The low-frequency clock signal CKL is supplied to the timing generator 43. The timing generator 43 generates a low-frequency system clock signal from the low-frequency clock signal CKL, and supplies the system clock signal to the CPU 41.

In step 4b, the CPU 41 outputs a battery-saving control signal to the battery-saving circuit 11 so as to supply power from the battery 12 to the receiver circuit 10. Upon a receipt of the battery-saving control signal, the circuit 11 supplies power to the receiver circuit 10, whereby both the radio circuit 2 and the demodulation circuit 3 go into operation. Then, in step 4c, the CPU 41 determines whether or not the pager receiver has detected a preamble word consisting of a synchronization signal and a group designation signal for identifying group signals to the pager. If YES, the CPU 41 sets the timer (not shown) in step 4d. More precisely, the timer is set when the synchronization word in the paging signals for group 2 is received, assuming that the pager receiver belongs to group 2. The timer will be automatically reset when the pager receiver receives group 2 contained in the next frame of the paging signal. In step 4e, the CPU 41 collates the ID code stored in the ID- ROM 5 with the ID code contained in each calling word for group 2.

Figure 3:
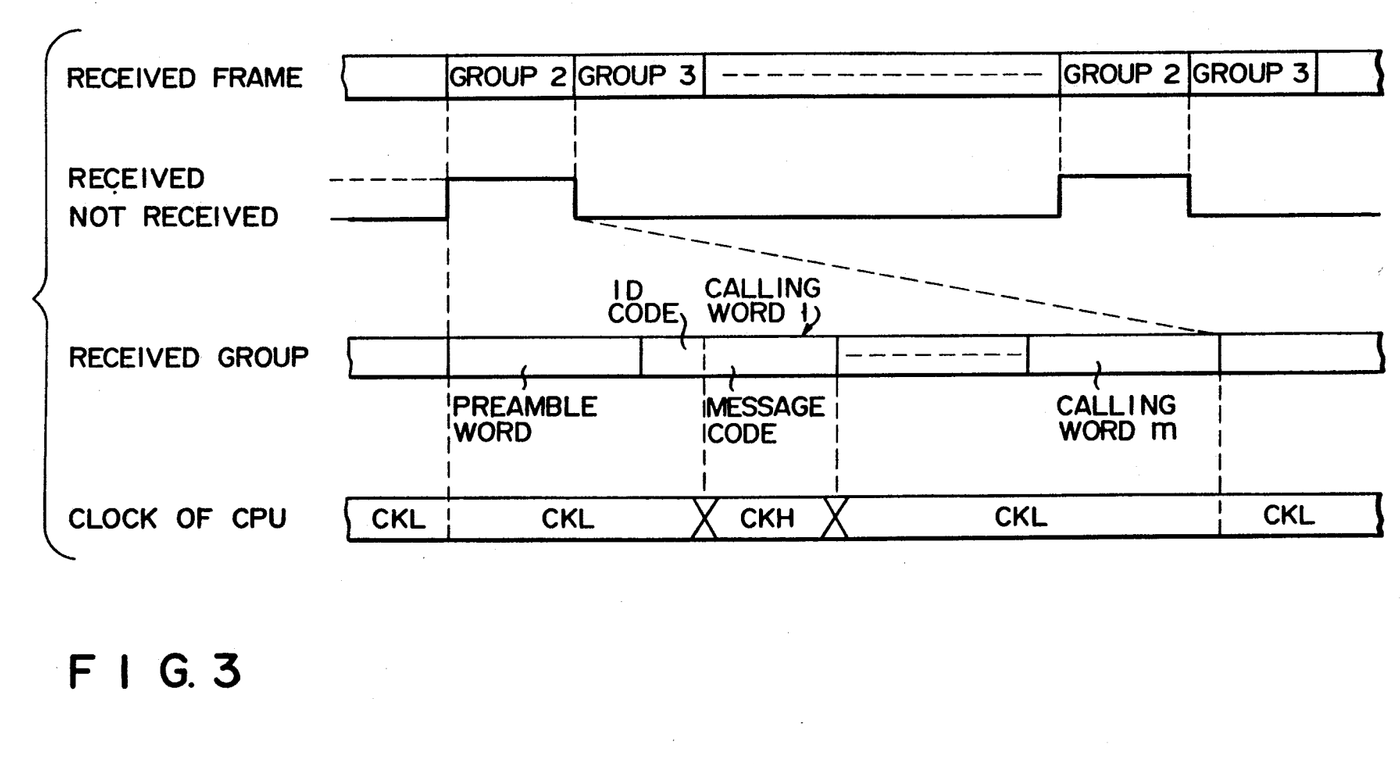
FIG. 3 is a timing chart explaining the operation of the pager receiver illustrated in FIG. 1.

If the ID code stored in the ID-ROM 5 is identical with the ID code contained in calling word 1, CPU 41 determines that the pager receiver is being called. Then, the operation goes to step 4j, in which the CPU 41 outputs a high-frequency setting signal to the system-clock controller 44. In response to this signal, the system-clock controller 44 supplies an oscillation start/stop control signal SS to the clock generator 42, for driving the high-frequency clock generator 42H. Thus, the clock generator 42H starts outputting a high-frequency clock signal CKH, whereas the, low-frequency clock generator 42L is brought into an inoperative condition, as is clearly shown in the timing chart of FIG. 3. The high-frequency clock signal CKH is supplied to the timing generator 43. The timing generator 43 generates a high-frequency system clock signal from the high-frequency clock signal CKH, and supplies this system clock signal to the CPU 41. Therefore, the CPU 41 is driven at a high speed to correct error bits, if any, in the message code which is contained in calling word 1. In step 4k, the receiver circuit 10 receives the message code. In the next step, i.e., step 4l, the CPU 41 corrects the message code.

Thereafter, the operation goes to step 4m, in which the CPU 41 outputs a low-frequency setting signal to the system-clock controller 44. In response to this signal, the controller 44 supplies an oscillation start/stop control signal SS to the clock generator 42, for driving the low-frequency clock generator 42L. As a result, the low-frequency clock generator 42L starts outputting a low-frequency clock signal CKL, whereas the high-frequency clock generator 42H is set into an inoperative condition, as can be seen in the timing chart of FIG. 3. The low-frequency clock signal CKL is supplied to the timing generator 43. The timing generator 43 produces the low-frequency system clock signal from the low-frequency clock signal CKL, and supplies this system clock signal to the CPU 41. Therefore, the CPU 41 is then driven at a low speed.

In the next step, i.e., step 4n, the CPU 41 outputs an alarm signal to the drive circuit 6. In response to this signal, the circuit 6 drives the loudspeaker 7. Thus, the loudspeaker 7 generates a beep sound, informing the user of the pager receiver that he or she is being called. At the same time, the CPU 41 writes the message code into the message RAM 81, and demodulates the message code into message information and supplies this information to the LCD 8. The LCD 8 displays the message information, whereby the user can read the message sent from the caller.

Thereafter, the operation goes to step 4f. In this step, the CPU 41 determines whether or not the ID code stored in the ID-ROM 5 has been collated with the ID codes contained in all calling words of group 2 to which the pager receiver belongs. If NO, the operation returns to step 4e, in which the ID code in the ID-ROM 5 is collated with the ID code contained in the next calling word. If YES in step 4f, that is, if the CPU 41 determines that all the ID codes included in group signals consisting of calling words for group 2 have been checked, the operation proceeds to step 4h. In step 4h, the CPU 41 outputs a battery-saving control signal to the battery-saving circuit 11 in order not to supply power to the receiver circuit 10. Upon a receipt of this control signal, the circuit 11 stops supplying power from the battery 12 to the circuit 10. As a result, both the radio circuit 2 and the demodulation circuit 3 are rendered inoperative, as can be understood from FIG. 3. In other words, the pager receiver is brought into a battery-saving condition, in which only the CPU 41 performs its function. In step 4i, the CPU 41 determines whether or not the time set by the timer (not shown) has elapsed. If YES, the CPU 41 detects that the pager receiver has just started receiving the next frame. In this case, the operation returns to step 4b. Steps 4b to 4n are then executed, as has been explained, at this time for the next frame.

As has been described, it is the high-frequency clock generator 42H that operates while the pager receiver is receiving the message code contained in the calling word for group 2 to which the pager receiver belongs, and it is the low-frequency clock generator 42L that operates at all other times.

If YES in step 4f, that is, if all the ID codes included in a group signal consisting of calling words for groups 2 have been checked, the operation goes to step 4h. In step 4h, the CPU 41 causes the battery-saving circuit 11 to stop supplying power to the receiver circuit 10. As a result, the pager receiver is set into the battery-saving condition. In other words, the low-frequency clock generator 42L continues to operate as long as the pager receiver remains not called.

Since the high-frequency clock generator 42H operates only while the pager receiver is receiving the message code contained in calling word 1 of group 2, and the low-frequency clock generator 42L operates at all other times, the control circuit 40 consumes less power than its counterpart of the prior-art pager receiver in which the high-frequency clock generator operates all the time the whole frame of the paging signal is received. Hence, the power consumption of the pager receiver is conserved, and the battery can last longer. Therefore, the running cost of the pager receiver may be saved.

Figure 4:
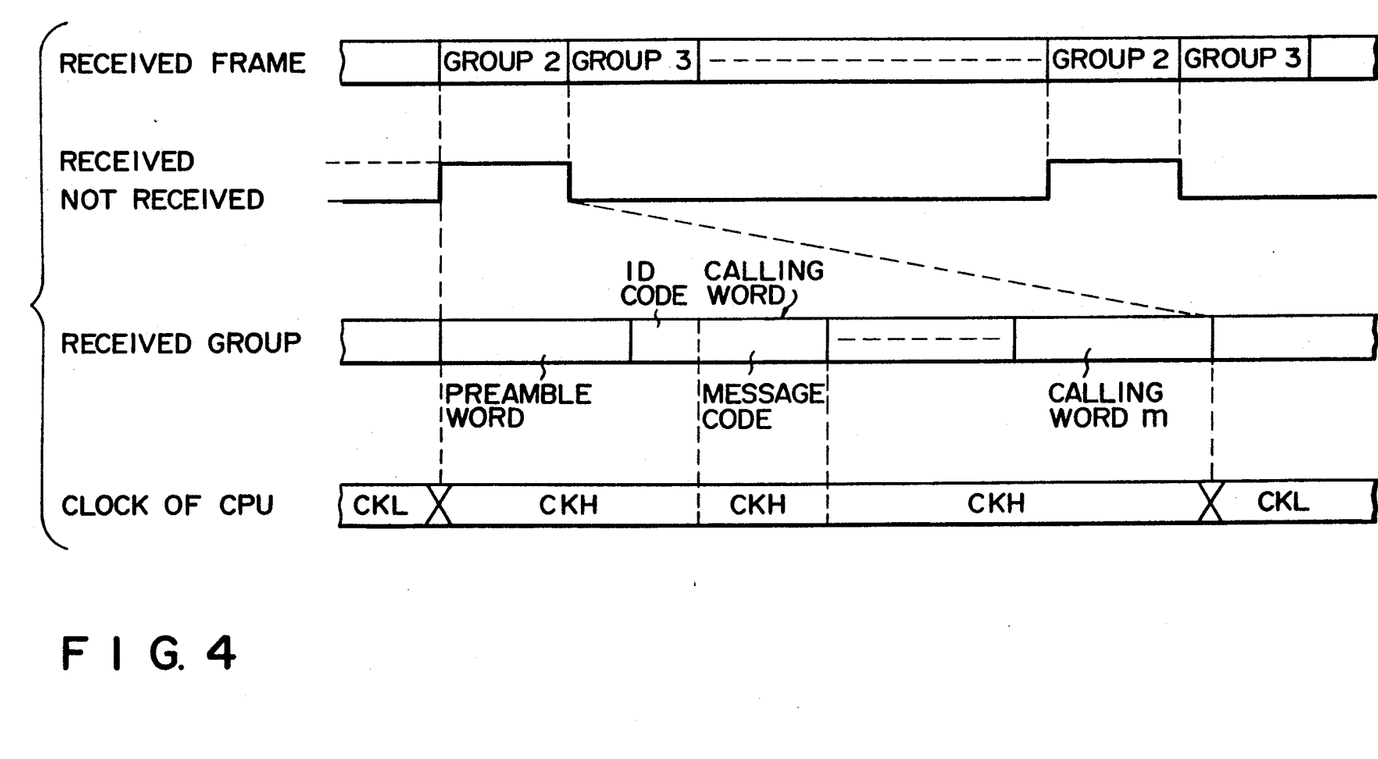
FIG. 4 is also a timing chart explaining the operation of a modification of the page receiver shown in FIG. 1.

The first embodiment of the invention, which has been described, can be modified in some ways. For example, as is shown in FIG. 4, the high-frequency clock generator 42H can be operated continuously while the pager receiver is receiving the group 2 of the paging signal, and the low-frequency clock generator 42L is operated while the pager receiver is receiving any other group. In this case, too, the pager receiver consumes less power than the conventional one wherein the high-frequency clock generator continues to operate all the time the entire frame of a paging signal is received, and the battery lasts longer than in the conventional pager receiver. Further, in this case, even if the paging signal has been transmitted at a high speed, the synchronization words contained in group 2 can be detected, and the ID codes contained in the calling words in group 2 can be collated with the ID code stored in the ID-ROM 5.

Figure 5:
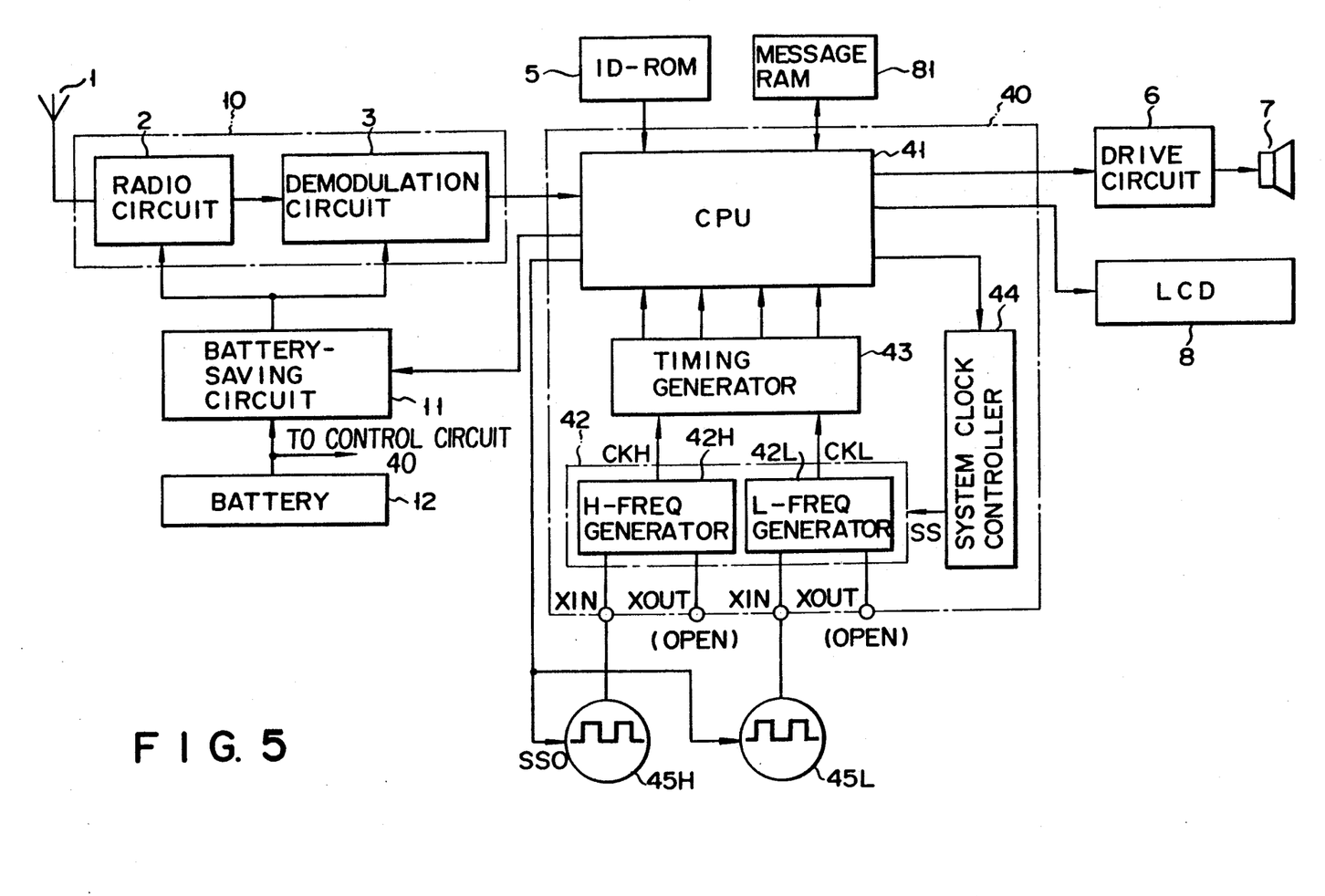
FIG. 5 block diagram illustrating the modification of the pager receiver shown in FIG. 1.

Moreover, as is shown in FIG. 5, a clock generator 45H can be coupled to the connecting terminal XIN of the high-frequency clock generator 42H, and a clock generator 45L can be coupled to the connecting terminal XIN of the low-frequency clock generator 42L, and the connecting terminals XOUTs of the clock generators 42H and 42L can be made open. In this instance, since the terminals XOUTs are open, both clock generators 42H and 42L are rendered inoperative, and the clock signals output by the generators 45H and 45L are supplied to the timing generator 43. The clock generators 45H and 45L each have a terminal each for receiving the generation start/stop control signal SSO output from the control circuit 40. Thus, the clock generators 45H and 45L can be alternately operated in accordance with the level of this control signal SSO. Hence, the control circuit 40 can be driven by a high-frequency clock signal and a low-frequency clock signal, provided that the circuit 40 supplies the control signal SSO to the clock generators 45H and 45L in steps 4b, 4j, and 4m of the flow chart shown in FIG. 2. This modified pager receiver also consumes less power than the conventional one, thus lengthening the life-time of the battery provided in it.

Second Embodiment

Figure 6:
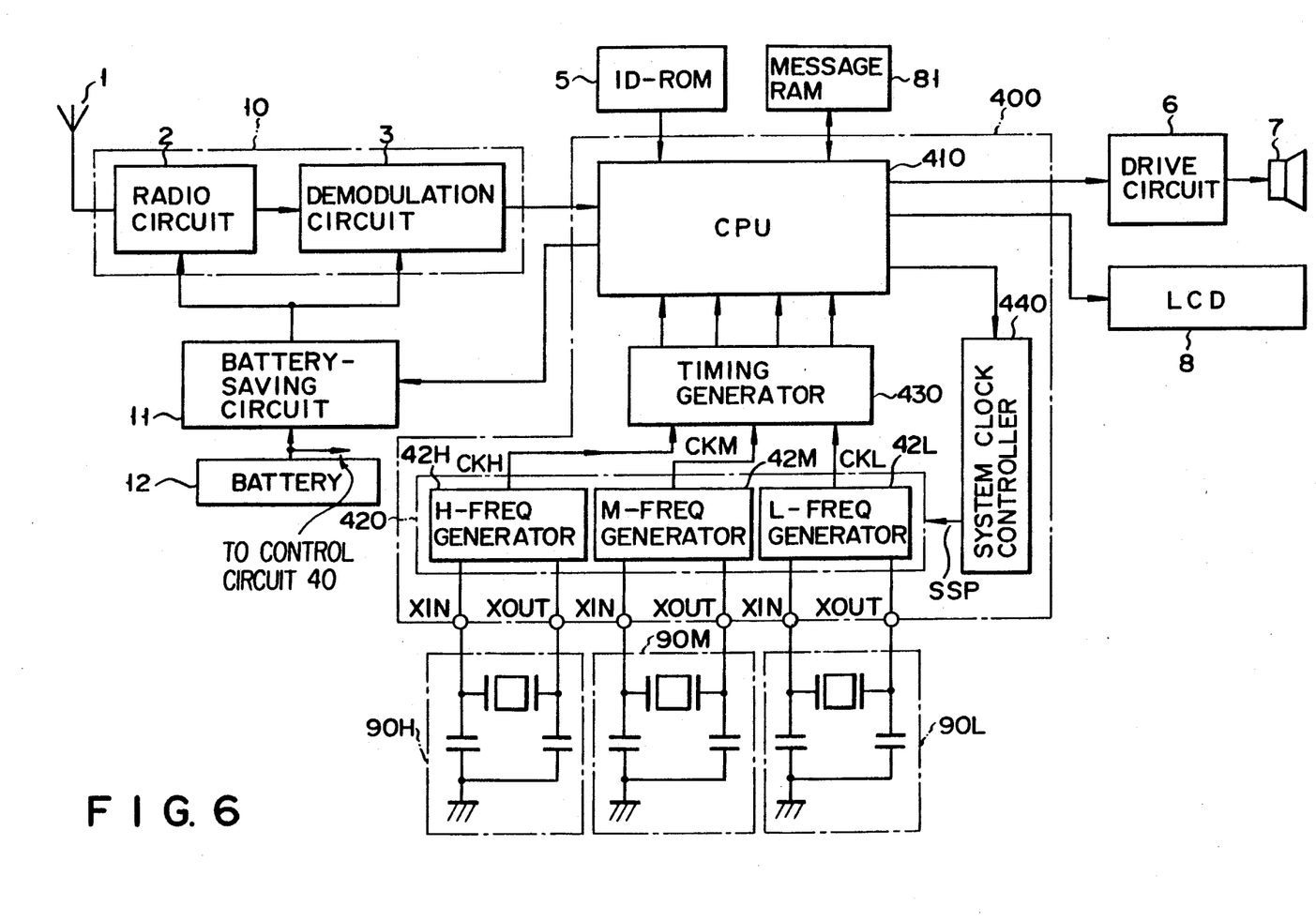
FIG. 6 is block diagram illustrating a pager receiver which is a second embodiment of the invention.

FIG. 6 schematically shows a pager receiver according to a second embodiment of the present invention. The same components as those shown in FIG. 1 are designated by the same numerals.

The control circuit 400 of the pager receiver comprises a CPU 410, a clock generator 420, a timing generator 430, and a system clock controller 440. The clock generator 420 has a high-frequency clock generator 42H for generating a high-frequency (1.2 MHz) clock signal CKH, a low-frequency clock generator 42L for generating a low-frequency (32 KHz) clock signal CKL, and an intermediate-frequency clock generator 42M. The intermediate-frequency clock generator 42M is connected by connecting terminals XIN and XOUT to a ceramic oscillator 90M. When driven, the clock generator 42M energizes the ceramic oscillator 90M, thereby to generate an intermediate-frequency clock signal CKM having a frequency of, for example, 480 KHz. The timing generator 430 divides the frequencies of the clock signals CKH, CKM, and CKL generated by clock generators 42H, 42M, and 42L, forming system clock signals which the CPU 410 requires. The system clock controller 440 generates an oscillation control signal SSP for selecting and driving one of the clock generators 42H, 42M, and 42L, in accordance with a frequency-setting signal output from the CPU 410.

Figure 7:
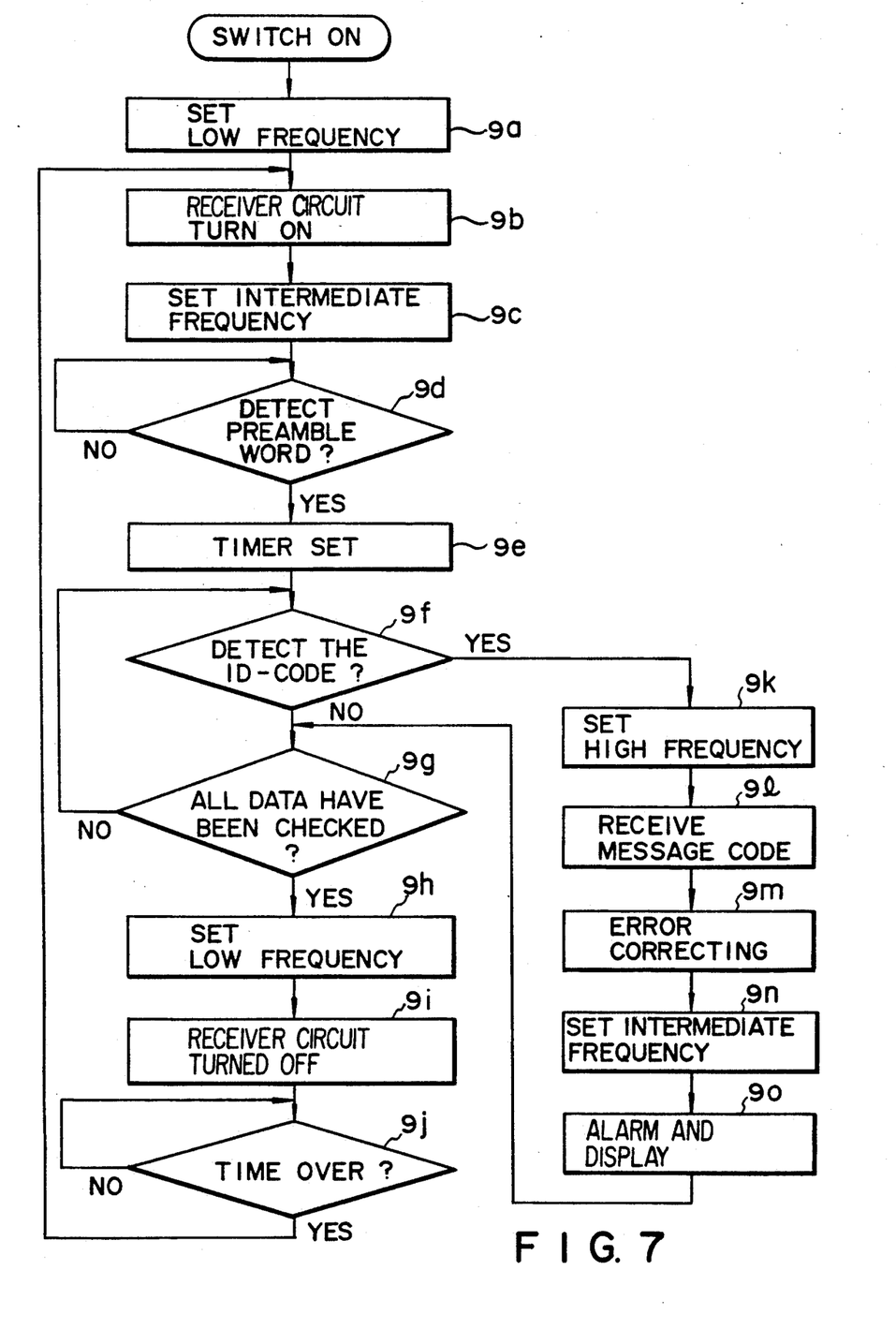
FIG. 7 is a flow chart explaining the operation of the control circuit provided in the pager receiver illustrated in FIG. 6.

The operation of the pager receiver, described above, will now be explained with reference to the flow chart of FIG. 7 which illustrates the operations of the CPU 410 in the control circuit 400.

First, the user turns on the power switch (not shown) of the pager receiver, whereby power is supplied from the battery 12 to the control circuit 400. The CPU 410 in the circuit 400 initializes itself, and outputs a low-frequency setting signal to the system-clock controller 440 in step 9a. In response to this signal, the system-clock controller 440 supplies a control signal SSP to the clock generator 420, for driving the low-frequency clock generator 42L. As a result, the low-frequency clock generator 42L starts outputting a low-frequency clock signal CKL, whereas the intermediate-frequency clock generator 42M and the high-frequency clock generator 42H remain in inoperative conditions. The low-frequency clock signal CKL is supplied to the timing generator 430. The timing generator 430 generates a low-frequency system clock signal from the low-frequency clock signal CKL, and supplies the system clock signal to the CPU 410.

Figure 8:
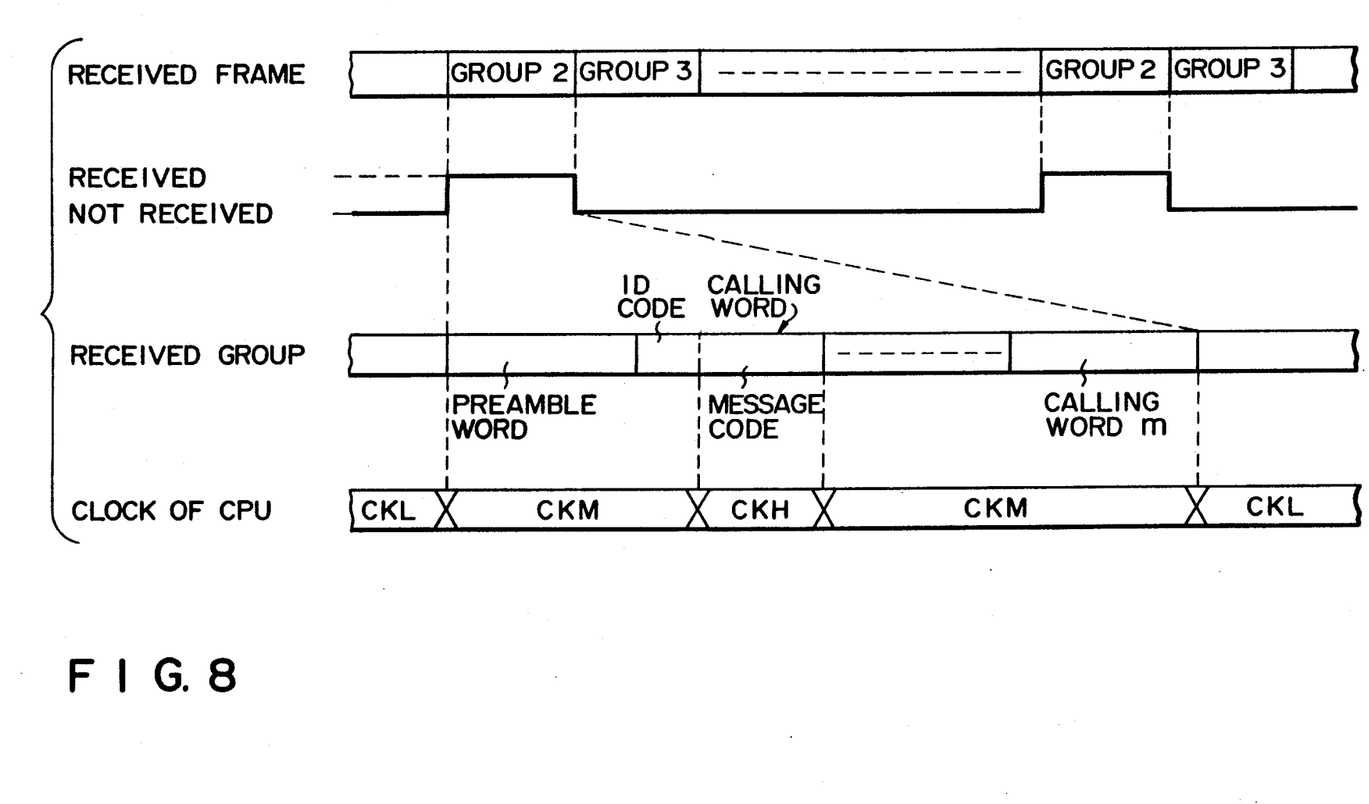
FIG. 8 is a timing chart explaining the operation of the pager receiver illustrated in FIG. 6.

In step 9b, the CPU 410 outputs a battery-saving control signal to a battery-saving circuit 11 so as to supply power from the battery 12 to a receiver circuit 10. Upon receipt of the battery-saving control signal, the battery-saving circuit 11 supplies power to the receiver circuit 10, whereby both the radio circuit 2 and demodulation circuit 3 in the circuit 10 go into operation. Then, in step 9c, the CPU 410 outputs an intermediate-frequency setting signal to the system-clock controller 440. In response to this signal, the system-clock controller 440 supplies a control signal SSP to the clock generator 420, for driving the intermediate-frequency clock generator 42M. Hence, only the intermediate-frequency clock generator 42M is driven and starts outputting an intermediate-frequency clock signal CKM, as is illustrated in FIG. 8. This clock signal CKM is supplied to the timing generator 430. The timing generator 430 generates an intermediate-frequency system clock signal of the clock signal CKM, and supplies this system clock signal to the CPU 410. As a result, the CPU 410 can operate at a higher speed than when driven by the system clock signal produced from the low-frequency clock signal CKL.

In step 9d, the CPU 410 determines whether or not the pager receiver has detected the preamble word including a synchronization word and the group designation signal within a group signal. If YES, the CPU 410 sets the timer (not shown) in step 9e. More precisely, the timer is set when the preamble word for group 2 is received, assuming that the pager receiver belongs to group 2. The timer will be automatically reset when the pager receiver receives group 2 contained in the next frame of the paging signal. In step 9f, the CPU 410 collates the ID code stored in an ID-ROM 5 with the ID code contained in each calling word for group 2.

If the ID code stored in the ID-ROM 5 is identical with the ID code contained in calling word 1, CPU 410 determines that the pager receiver is being called. Then, the operation goes to step 9k, in which the CPU 410 outputs a high-frequency setting signal to the system-clock controller 440. In response, to this signal, the system-clock controller 440 supplies an oscillation start/stop control signal SSP to the clock generator 420, for driving the high-frequency clock generator 42H. Thus, the clock generator 42H starts outputting a high-frequency clock signal CKH. Hence, the clock signal is switched from the intermediate-frequency clock signal CKM to the high-frequency clock signal CKH, as is shown in FIG. 8. The high-frequency clock signal CKH is supplied to the timing generator 430. The timing generator 430 generates a high-frequency system clock signal from the high-frequency clock signal CKH, and supplies this system clock signal to the CPU 410. Therefore, the CPU 410 is driven at a high speed to correct error bits, if any, in the message code which is contained in calling word 1. In step 9l, the receiver circuit 10 receives the message code. In the next step, i.e., step 9m, the CPU 410 corrects the message code.

Thereafter, the operation goes to step 9n, in which the CPU 410 outputs an intermediate-frequency setting signal to the system clock controller 440. In response to this signal, the controller 440 supplies an oscillation start/stop control signal SSP to the clock generator 420, for driving the intermediate-frequency clock generator 42M. As a result, the intermediate-frequency clock generator 42M starts outputting an intermediate-frequency clock signal CKM, as is understood from FIG. 8. The clock signal CKM is supplied to the timing generator 430. The timing generator 430 produces an intermediate-frequency system clock signal from the clock signal CKM, and supplies this system clock signal to the CPU 410. Therefore, the CPU 410 is driven at intermediate speed.

In the next step, i.e., 9o, the CPU 410 generates an alarm signal to a drive circuit 6. In response to the alarm signal, the circuit 6 drives the loudspeaker 7. Thus, the loudspeaker 7 generates a beep sound, informing the user of the pager receiver that he or she is being called. At the same time, the CPU 410 writes the message code into a message RAM 81, and demodulates the message code into message information and supplies this information to the LCD 8. The LCD 8 displays the message information, whereby the user can read the message sent from the caller.

Thereafter, the operation goes to step 9g. In this step, the CPU 410 determines whether or not all the ID codes included in the group signal have been checked against the stored ID code. If NO, the operation returns to step 9f, in which the ID code in the ID-ROM 5 is collated with the ID code contained in the next calling word. If YES in step 9g, that is, if the CPU 410 determines that all the ID codes included in the group signal have been checked against the stored ID code, the operation proceeds to step 9h. In step 9h, the CPU 410 supplies a low-frequency setting signal to the system clock controller 440. In response to this signal, the controller 440 outputs an oscillation start/stop signal SSP to the clock generator 420. Hence, only the low-frequency clock generator 42L operates, outputting a low-frequency clock signal CKL to the timing generator 430. The timing generator 430 generates a low-frequency system clock signal from the clock signal CKL, and supplies the system clock signal to the CPU 410. Therefore, the CPU 410 then operates at a low speed.

In step 9i, the CPU 410 outputs a battery-saving control signal to the battery-saving circuit 11 in order not to supply power to the receiver circuit 10. Upon receipt of this control signal the circuit 11 stops supplying power from the battery 12 to the circuit 10. As a result, both the radio circuit 2 and the demodulation circuit 3 are rendered in-operative, as can be understood from FIG. 8. That is, the pager receiver is brought into a battery-saving condition, in which only the CPU 410 performs its function. In step 9j, the CPU 410 determines whether or not the time set to the timer (not shown) has elapsed. If YES, the CPU 410 detects that the pager receiver has just started receiving the next frame. In this case, the operation returns to step 9b. Steps 9b to 9o are then executed, as has been explained, this time for the next frame.

As has been described, it is the high-frequency clock generator 42H that operates while the pager receiver is receiving the message code contained in the calling word for group 2 to which the pager receiver belongs, it is the intermediate-frequency clock generator 42M that operates while the pager receiver is receiving all other codes contained in group 2, and it is the low-frequency clock generator 42L that operates while the pager receiver is receiving any group other than group 2.

If YES in step 9f, that is, if all the ID codes included in the group signal have been checked against the stored ID code, the operation goes to step 9h. In step 9i, the CPU 410 causes the battery-saving circuit 11 to stop supplying power to the receiver circuit 10. As a result, the pager receiver is set into the battery-saving condition. In other words, the low-frequency clock generator 42L continues to operate as long as the pager receiver remains not called.

Since the high-frequency clock generator 42H operates only while the pager receiver is receiving the message code contained in calling word 1 of group 2, and the intermediate-frequency clock generator 42M or the low-frequency clock generator 42L operates at all other times, the control circuit 400 consumes less power than its counterpart of the prior-art pager receiver in which the high-frequency clock generator operates all the time the whole frame of the paging signal is received. Hence, the power consumption of the pager receiver is small, and the battery can last longer. Therefore, the running cost of the pager receiver is low.

Moreover, since the intermediate-frequency clock generator 42M operates while the pager receiver is receiving any code contained in group 2, other than the message code, the CPU 410 is driven by the system clock signal generated from the intermediate-frequency clock signal CKM to detect the synchronization word and collate the ID codes. Hence, the synchronization word can be reliably detected, and the ID codes can be correctly collated, even if the paging signal is transmitted at so high a speed that the CPU 410 fails to detect the synchronization word or to collate the ID codes accurately when driven by the low-frequency system clock signal.

In the above described embodiments, although arrangements of a pager and its operation are explained in detail, it is apparent to those skilled in the art to apply the present invention to a cordless telephone or a mobile telephone. Still, the present invention may be applied to a signal processing unit of any kind of electronic equipment.

The present invention is not limited to the embodiments described above. For instance, the structure of the clock generators, the number thereof, the structure of the system clock controller, and the sequence of controlling the clock generators can be altered in various ways, without departing from the scope of the present invention.

What is claimed is:

1. A radio telecommunication apparatus comprising:
first generating means for generating a first clock signal having a first frequency;
second generating means for generating a second clock signal having a second frequency which is higher in frequency than the first frequency;
receiving means for receiving signals transmitted over at least a radio channel;
control means, coupled to said first generating means, second generating means, and receiving means, for detecting a preamble word addressed to the radio telecommunication apparatus and a first signal sequence within the received signals, the first signal sequence being associated with an information indicative of the apparatus, and for identifying a message signal sequence received in association with the first signal sequence within the received signals, said control means being supplied with the first clock signal by said first generating means so that said control means operates on the basis of the first frequency at least while said receiving means receives the first signal sequence, and being supplied with the second clock signal by said second generating means so that said control means operates on the basis of the second frequency at least while said receiving means receives the message signal sequence; and power supply means, coupled to said control means for intermittently providing electrical power supply of a predetermined time period to said control means and said receiving means in synchronization with the detection of the preamble word by said receiving means, wherein the preamble word, the first signal sequence and the message signal sequence are received within the predetermined time period so that said control means and said receiving means are provided with the electrical power supply for the predetermined time period by said power supply means and operate on the basis of the first frequency at least while said receiving means receives the first signal sequence, and operate on the basis of the second frequency at least while said receiving means receives the message signal sequence.

2. The apparatus of claim 1, further comprising:
alarming means responsive to said control means for alarming a user of the apparatus in response to a detection of the first signal sequence.

3. The apparatus of claim 1, wherein said first and second generating means comprise quartz oscillators for providing first and second basic frequency signals corresponding to the first and second clock signals, respectively.

4. The apparatus of claim 1, wherein the first signal sequence includes at least an identification code of the apparatus and the codes originated in the apparatus includes at least the identification code of the apparatus, which is prestored in the apparatus.

5. The apparatus of claim 4, wherein the first signal sequence further includes an error correction code which is generated on the basis of the identification code included therein and the codes originated in the apparatus further includes an error correction code which is generated on the basis of the identification code stored in the apparatus.

6. The apparatus of claim 4, wherein the first signal sequence further includes a predetermined signal sequence for acquiring synchronization and a group signal for a group of pagers including the pager and the codes originated in the apparatus further include the predetermined signal sequence and the group signal.

7. The apparatus of claim 1, wherein said second signal sequence includes at least a message signal.

8. The apparatus of claim 7, further comprising display means responsive to said control means for an identified message signal upon identifying the message signal.

9. The apparatus of claim 7, wherein the message signal is accompanied with an error correction code which is generated on the basis of the message signal.

10. The apparatus of claim 9, wherein said control means corrects errors in the received message signal, if any, by referring to the error correction code.

11. The apparatus of claim 1, wherein said control means is a single chip microprocessor.

12. A method for controlling operations of a signal processing circuit in a pager, said signal processing circuit detecting a first preamble word addressed to the pager and a first signal sequence within signals received by receiving means of the pager and identifying a second signal sequence received in association with the first signal sequence within the received signals, comprising the steps of:

intermittently providing electrical power supply of a predetermined time period to the signal processing circuit and the receiving means in synchronization with the detection of the preamble word by the receiving means;

applying a first frequency signal to said signal processing circuit at least while the first signal sequence is detected by said signal processing circuit within the predetermined time period so that signal processing for detecting the first signal sequence is performed on the basis of the first frequency signal, the first signal sequence being associated with an information indicative of the pager; and applying a second frequency signal to said signal processing circuit at least while the second signal sequence is identified by said signal processing circuit within the predetermined time period so that signal processing for identifying the second signal sequence is performed on the basis of the second frequency signal, the second signal sequence being associated with an information to be informed to a user of said pager, the second frequency signal being higher in frequency than that of the first frequency signal.

13. The method of claim 12, comprising the step of changing a frequency signal to be applied to said signal processing circuit from the first frequency signal to the second frequency signal in response to a detection of the first signal sequence.

14. The method of claim 12, comprising the step of changing a frequency signal to be applied to said signal processing circuit from the second frequency signal to the first frequency signal in response to a detection of one or more of the second signal sequence.

15. The method of claim 12, wherein said signal processing circuit detects the first signal sequence by comparing the received signals with one or more codes originated in the pager.

16. The method of claim 12, wherein the first signal sequence includes at least an identification code of the apparatus and the codes originated in the pager include at least an identification code which is prestored in the pager.

17. The method of claim 16, wherein the first signal sequence further includes an error correction code which is generated on the basis of the identification code included therein and the codes originated in the pager further include an error correction code which is generated on the basis of the prestored identification code.

18. The method of claim 12, wherein the second signal sequence includes at least a message signal.

19. The method of claim 18, wherein the message signal is accompanied with an error correction code which is generated on the basis of the message signal.

20. The method of claim 19, wherein errors existing in the received message signal, if any, are corrected by referring to the error correction code.

21. The method of claim 12, further comprising a step of applying a third frequency signal to said signal processing circuit before the first signal sequence is detected, the third frequency signal being lower in frequency than that of the first frequency signal.

22. A pager receiver comprising:
receiver means for receiving a group signal addressed to the pager receiver from a base station, and demodulating the group signal;

control means for collating an ID code, contained in a demodulated group signal output from said receiver means, with an ID code assigned to the pager receiver, and for decoding a message code contained in the demodulated group signal, when said ID codes are identical;

power supply means or intermittently providing electrical power supply of a predetermined time period to said receiver means and said control means in synchronization with the detection of the group signal by said receiver means;

first clock generating means for generating a first clock signal having a predetermined frequency;

second clock generating means for generating a second clock signal having a higher frequency than that of said first clock signal;

generation control means for generating and supplying a generation control signal under the control of said control means to said first clock generating means within the predetermined time period to drive said first clock generating means while said control means is collating the ID code in the demodulated group signal with the ID code assigned to the pager receiver, and to said second clock generating means within the predetermined time period to drive said second clock generating means while said control means is decoding the message code; and system clock generating means for generating a system clock signal from the clock signal generated by one of said first and second clock generating means and supplying the system clock signal to said control means to drive said control means.

23. The pager receiver according to claim 22, wherein said first and second clock generating means each comprises a clock generator and connecting terminals coupled to the oscillator, said clock generator being incorporated in a control unit, along with said control means, said system clock generating means, and said generation control means.

24. The pager receiver according to claim 22, wherein said first and second clock generating means are clock generators connected to a control unit comprising said control means, said system clock generating means, and said generation control means.

25. A pager receiver comprising:

receiver means for receiving a paging signal addressed to the pager receiver from a base station, and demodulating the group signal;

control means for collating an ID code, contained in a demodulated group signal output from said receiver means, with an ID code assigned to the pager receiver, and for decoding a message code contained in the demodulated group signal, when said ID codes are identical;

power supply means or intermittently providing electrical power supply of a predetermined time period to said receiver means and said control means in synchronization with the detection of the group signal by said receiver means;

first clock generating means for generating a first clock signal having a predetermined frequency;

second clock generating means for generating a second clock signal having a higher frequency than that of said first clock signal;

third clock generating means for generating a third clock signal having a frequency which is lower in frequency than that of said first clock signal;

generation control means for generating and supplying a generation control signal under the control of said control means to said second clock generating means within the predetermined time period to drive said second clock means while said control means is decoding the message code in the demodulated group signal, to said first clock generating mean within the predetermined time period to drive said first generating means while the pager receiver is receiving the signals other than the message code that is contained in said group signal, and to said third clock generating means within the predetermined time period to drive said third clock generating means except for the predetermined time period in which said receiver means and said control means are supplied the electrical power supply from said power supply means; and system clock generating means for generating a system clock signal from the clock signal generated by one of said first, second, and third clock generating means and supplying the system clock signal to said control means to drive said control means.

26. The pager receiver according to claim 25, wherein said first, second, and third clock generating means each comprises a clock generator and connecting terminals coupled to an oscillator, said clock generator being incorporated in a control unit, along with said control means, said system clock generating means, and said generation control means.

27. The pager receiver according to claim 25, wherein said first, second, and third clock generating means are clock generators connected to a control unit comprising said control means, said system clock generating means, and said generation control means.

* * * * *